United States Patent
Morparia et al.

(10) Patent No.: US 10,075,456 B1
(45) Date of Patent: Sep. 11, 2018

(54) SYSTEMS AND METHODS FOR DETECTING EXPLOIT-KIT LANDING PAGES

(71) Applicant: Symantec Corporation, Mountain View, CA (US)

(72) Inventors: Jeet Morparia, Mountain View, CA (US); Liam OMurchu, Marina Del Rey, CA (US); Ravi Patel, Culver City, CA (US); Valentine Saengphaibul, San Gabriel, CA (US); Yana Liu, Agoura Hills, CA (US)

(73) Assignee: Symantec Corporation, Mountain View, CA (US)

( * ) Notice: Subject to any disclaimer, the term of this patent is extended or adjusted under 35 U.S.C. 154(b) by 1 day.

(21) Appl. No.: 15/061,057

(22) Filed: Mar. 4, 2016

(51) Int. Cl.
*H04L 29/06* (2006.01)
*H04L 29/08* (2006.01)

(52) U.S. Cl.
CPC ........ *H04L 63/1416* (2013.01); *H04L 63/145* (2013.01); *H04L 63/1433* (2013.01); *H04L 67/02* (2013.01)

(58) Field of Classification Search
CPC ... H04L 63/14; H04L 63/145; H04L 63/1408; H04L 63/1416; H04L 63/1441; H04L 63/1491; H04L 63/1433; H04L 67/02
See application file for complete search history.

(56) References Cited

U.S. PATENT DOCUMENTS

| | | | | |
|---|---|---|---|---|
| 7,774,459 B2* | 8/2010 | Wang | .................. | H04L 63/1416 709/224 |
| 8,196,205 B2* | 6/2012 | Gribble | .................. | G06F 21/53 713/168 |
| 8,365,297 B1* | 1/2013 | Parshin | ................. | G06F 21/575 713/2 |
| 8,812,652 B2* | 8/2014 | Wang | .................. | H04L 63/1416 709/224 |

(Continued)

OTHER PUBLICATIONS

M. T. Qassrawi and H. Zhang, "Using Honeyclients to Detect Malicious Websites," May 22-23, 2010, 2010 2nd International Conference on E-business and Information System Security, Wuhan, 2010, pp. 1-6.*

(Continued)

*Primary Examiner* — Nelson Giddins
(74) *Attorney, Agent, or Firm* — FisherBroyles, LLP

(57) ABSTRACT

The disclosed computer-implemented method for detecting exploit-kit landing pages may include detecting an attempt to access a web page via a computing device. The web page may be an unknown landing page of an exploit kit that includes a script that may be used by the exploit kit to access attributes of the computing device that may be used by the exploit kit to select suitable exploit code for compromising the computing device. The disclosed computer-implemented method may further include (1) monitoring one or more behaviors of the script, (2) detecting an attempt by the script to access an attribute of the computing device, (3) determining, based on the attempt to access the attribute, that the (Continued)

web page is likely a landing page of the exploit kit, and (4) performing a security action in response to the determination. Various other methods, systems, and computer-readable media are also disclosed.

20 Claims, 5 Drawing Sheets

(56) References Cited

U.S. PATENT DOCUMENTS

| | | | |
|---|---|---|---|
| 8,844,032 B2* | 9/2014 | Saidi | G06F 21/6218 |
| | | | 726/22 |
| 9,213,839 B2* | 12/2015 | Cao | G06F 21/563 |
| 9,319,428 B2* | 4/2016 | Freeman | H04L 63/168 |
| 9,356,941 B1* | 5/2016 | Kislyuk | H04L 63/14 |
| 9,596,255 B2* | 3/2017 | Wang | H04L 63/1416 |
| 9,723,016 B2* | 8/2017 | Hu | H04L 63/1425 |
| 9,825,976 B1* | 11/2017 | Gomez | H04L 63/1416 |
| 2003/0120951 A1* | 6/2003 | Gartside | G06F 21/562 |
| | | | 726/4 |
| 2007/0192859 A1* | 8/2007 | Shahar | G06F 21/552 |
| | | | 726/22 |
| 2007/0208822 A1* | 9/2007 | Wang | H04L 63/1416 |
| | | | 709/217 |
| 2008/0301139 A1* | 12/2008 | Wang | G06F 17/30887 |
| 2008/0313735 A1* | 12/2008 | Harrison | G06F 21/51 |
| | | | 726/23 |
| 2010/0306851 A1* | 12/2010 | Zhou | G06F 21/554 |
| | | | 726/25 |
| 2011/0307955 A1* | 12/2011 | Kaplan | H04L 63/0227 |
| | | | 726/23 |
| 2012/0079596 A1* | 3/2012 | Thomas | G06F 21/55 |
| | | | 726/24 |
| 2012/0174224 A1* | 7/2012 | Thomas | G06F 21/566 |
| | | | 726/24 |
| 2013/0014259 A1* | 1/2013 | Gribble | G06F 21/53 |
| | | | 726/24 |
| 2013/0339158 A1* | 12/2013 | Xie | G06Q 30/0248 |
| | | | 705/14.73 |
| 2014/0189864 A1* | 7/2014 | Wang | G06F 21/51 |
| | | | 726/23 |
| 2014/0283041 A1* | 9/2014 | Cao | G06F 21/563 |
| | | | 726/22 |
| 2014/0283084 A1* | 9/2014 | Lim | H04L 63/1433 |
| | | | 726/25 |
| 2014/0317754 A1* | 10/2014 | Niemela | H04L 63/1416 |
| | | | 726/26 |
| 2014/0380473 A1* | 12/2014 | Bu | G06F 21/53 |
| | | | 726/23 |
| 2015/0013006 A1* | 1/2015 | Shulman | H04L 63/1416 |
| | | | 726/23 |
| 2015/0113644 A1* | 4/2015 | Klein | G06F 9/545 |
| | | | 726/23 |
| 2015/0128247 A1* | 5/2015 | Rapaport | H04L 63/102 |
| | | | 726/13 |
| 2015/0128267 A1* | 5/2015 | Gupta | H04L 63/1408 |
| | | | 726/23 |
| 2015/0156203 A1* | 6/2015 | Giura | H04L 63/101 |
| | | | 726/4 |
| 2015/0163234 A1* | 6/2015 | Tal | H04L 63/145 |
| | | | 726/1 |
| 2015/0261955 A1* | 9/2015 | Huang | G06F 21/562 |
| | | | 726/23 |
| 2015/0341385 A1* | 11/2015 | Sivan | H04L 63/1466 |
| | | | 726/23 |
| 2015/0381636 A1* | 12/2015 | Luckett, Jr. | H04L 63/1416 |
| | | | 726/23 |
| 2016/0028746 A1* | 1/2016 | Tonn | H04L 63/145 |
| | | | 726/24 |
| 2016/0088015 A1* | 3/2016 | Sivan | H04L 29/06 |
| | | | 726/23 |
| 2016/0171415 A1* | 6/2016 | Yampolskiy | H04L 63/1433 |
| | | | 705/7.28 |
| 2016/0212153 A1* | 7/2016 | Livshits | G06F 17/30598 |
| 2016/0232358 A1* | 8/2016 | Grieco | G06F 21/577 |
| 2016/0283716 A1* | 9/2016 | Momot | G06F 21/566 |
| 2016/0285894 A1* | 9/2016 | Nelms | H04L 63/145 |
| 2016/0323305 A1* | 11/2016 | Koide | H04L 63/1408 |
| 2016/0328562 A1* | 11/2016 | Saxena | G06F 21/56 |
| 2016/0337387 A1* | 11/2016 | Hu | H04L 63/1425 |
| 2017/0054754 A1* | 2/2017 | Saher | H04L 63/1466 |
| 2017/0177866 A1* | 6/2017 | Hentunen | G06F 21/563 |
| 2017/0195353 A1* | 7/2017 | Taylor | H04L 67/22 |
| 2017/0251009 A1* | 8/2017 | Irimie | H04L 63/20 |
| 2017/0251010 A1* | 8/2017 | Irimie | H04L 63/20 |
| 2017/0286678 A1* | 10/2017 | Huang | G06F 21/562 |
| 2017/0293477 A1* | 10/2017 | Takata | G06F 13/00 |

OTHER PUBLICATIONS

C. Kolbitsch, B. Livshits, B. Zorn and C. Seifert, "Rozzle: De-cloaking Internet Malware," May 20-23, 2012, 2012 IEEE Symposium on Security and Privacy, San Francisco, CA, pp. 443-457.*
C. Kolbitsch, B. Livshits, B. Zorn and C. Seifert, "Rozzle: De-cloaking Internet Malware," Oct. 25, 2011, Microsoft Research Technical Report, MSR-TR-2011-94 pp. 1-21.*
Saxena et al., "A Symbolic Execution Framework for JavaScript", May 16-19, 2010, SP '10 Proceedings of the 2010 IEEE Symposium on Security and Privacy, pp. 513-528.*
Saxena et al., "A Symbolic Execution Framework for JavaScript", May 16-19, 2010, 2010 IEEE Symposium on Security and Privacy, pp. 1-18.*
Maio, et al., "PExy: The other side of Exploit Kits", Jan. 1, 2014, International Conference on Detection of Intrusions and Malware, and Vulnerability Assessment. pp. 132-151.*
Kirda, Engin et al., "Behavior-based Spyware Detection", https://www.cs.ucsb.edu/~vigna/publications/2006_kirda_kruegel_banks_vigna_kemmerer_USENIX.pdf, as accessed Jan. 5, 2016, (Jan. 2006).
De Maio, Giancarlo et al., "PExy: The other side of Exploit Kits", https://kapravelos.com/publications/dimva14_pexy.pdf, as accessed Jan. 5, 2016, 11th International Conference, DIMVA 2014, Egham, UK, (Jul. 10-11, 2014).
Zaharia, Andra, "The Ultimate Guide to Angler Exploit Kit for Non-Technical People [Updated]", https://heimdalsecurity.com/blog/ultimate-guide-angler-exploit-kit-non-technical-people/, as accessed Jan. 5, 2016, (On or before Jan. 5, 2016).
Howard, Fraser, "A closer look at the Angler exploit kit", https://blogs.sophos.com/2015/07/21/a-closer-look-at-the-angler-exploit-kit/, as accessed Jan. 5, 2016, (Jul. 21, 2015).
De Maio, Giancarlo et al., "PExy: The other side of Exploit Kits", https://books.google.com/books?id=2dokBAAAQBAJ&pg=PA133&lpg=PA133&dq=browser+plugin+to+detect+exploit+kits&source=bl&ots=8nDriBT206&sig=YHn4wQ87BJU5VVcdZ8q3Ng9m04A&hl=en&sa=X&ved=0CFEQ6AEwB2oVChMI-Nmqu6zUxwIVUpSICh2NLwSr, as accessed Jan. 5, 2016, Detection of Intrusions and Malware, and Vulnerability Assessment, vol. 8550 of the series Lecture Notes in Computer Science, (Jul. 10-11, 2014), p. 133.

* cited by examiner ns and methods for detecting exploit-kit landing pages.

SYSTEMS AND METHODS FOR DETECTING EXPLOIT-KIT LANDING PAGES

BACKGROUND

Today, exploit kits are popular attack vectors for delivering malware to users' computing devices. Exploit kits are generally used to automate the exploitation of client-side vulnerabilities. A typical exploit kit may be capable of exploiting many client-side vulnerabilities. A typical exploit kit may compromise a particular user's computing device when the user visits, via a web browser of the computing device, a landing page of the exploit kit by (1) executing a client-side script from the landing page that fingerprints the computing device, (2) using details about the computing device acquired during the fingerprinting process to determine a vulnerability of the computing device, (3) selecting suitable exploit code that takes advantage of the vulnerability, and (4) executing the exploit code on the computing device.

Typical security products may attempt to detect an exploit kit's attempts to compromise a computing device by detecting the exploit code used by the exploit kit (e.g., using static signatures) and/or by analyzing network traffic generated by the exploit kit. Unfortunately, such detection techniques are often easily bypassed with slight code modifications and/or other obfuscation techniques. Moreover, exploit kits often use zero-day exploits for which static signatures are generally unavailable. The instant disclosure, therefore, identifies and addresses a need for improved systems and methods for detecting exploit-kit landing pages.

SUMMARY

As will be described in greater detail below, the instant disclosure describes various systems and methods for detecting exploit-kit landing pages. In one example, a computer-implemented method for detecting exploit-kit landing pages may include detecting an attempt to access a web page via a computing device. In this example, the web page may be an unknown landing page of an exploit kit that includes a client-side script that is used by the exploit kit to access, at the computing device, attributes of the computing device that (1) may indicate a vulnerability of the computing device and (2) may be used by the exploit kit to select suitable exploit code for compromising the computing device. The computer-implemented method may further include (1) monitoring, in response to detecting the attempt to access the web page, behaviors of the client-side script, (2) detecting, while monitoring the behaviors of the client-side script, an attempt by the client-side script to access an attribute of the computing device, (3) determining, based at least in part on detecting the attempt to access the attribute, that the web page is likely a landing page of the exploit kit, and (4) performing a security action in response to determining that the web page is likely a landing page of the exploit kit.

In some examples, the step of detecting the attempt to access the web page via the computing device may include detecting an attempt by a user of the computing device to access the web page, and the step of performing the security action may include preventing the exploit code from compromising the computing device. In at least one example, the step of preventing the exploit code from compromising the computing device may include redirecting the user to a safe web page.

In some examples, the step of detecting the attempt by the client-side script to access the attribute of the computing device may include (1) detecting attempts by the client-side script to access each of the attributes and (2) recording a sequence in which the client-side script attempts to access each of the attributes, and the step of performing the security action may include using the sequence to detect an additional unknown landing page of the exploit kit.

In some examples, the computer-implemented method may further include recording, prior to the web page becoming a landing page of the exploit kit, attempts, by an additional client-side script of the web page, to access attributes of the computing device, and the step of determining that the web page is likely a landing page of the exploit kit may include determining that the client-side script and the additional client-side script attempted to access different attributes of the computing device.

In some examples, the step of determining that the web page is likely a landing page of the exploit kit may include determining that the client-side script accessed more than a threshold number of attributes of the computing device.

In various examples, the attribute may include an attribute of a web browser used to access the web page, an attribute of an operating system of the computing device, an attribute of a web-browser plugin, and/or an attribute of an application installed on the computing device. In at least one example, the client-side script may have been obfuscated.

In one embodiment, a system for implementing the above-described method may include a web-page detecting module, a monitoring module, a determining module, a security module, and at least one processor that executes the web-page detecting module, the monitoring module, the determining module, and the security module. In some examples, the web-page detecting module may be stored in memory and may detect an attempt to access a web page via a computing device. In such examples, the web page may be an unknown landing page of an exploit kit that includes a client-side script that is used by the exploit kit to access, at the computing device, attributes of the computing device that (1) may indicate a vulnerability of the computing device and (2) may be used by the exploit kit to select suitable exploit code for compromising the computing device.

In some examples, the monitoring module may be stored in memory and may (1) monitor, in response to the attempt to access the web page, behaviors of the client-side script and (2) detect, while monitoring the behaviors of the client-side script, an attempt by the client-side script to access an attribute of the computing device. In certain examples, the determining module may be stored in memory and may determine, based at least in part on the attempt to access the attribute, that the web page is likely a landing page of the exploit kit. In at least one example, the security module may be stored in memory and may perform a security action in response to a determination that the web page is likely a landing page of the exploit kit.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to detect an attempt to access a web page via the computing device. In this example, the web page may be a landing page of an exploit kit that includes a client-side script that is used by the exploit kit to access, at the computing device, attributes of the computing device that (1) may indicate a vulnerability of the computing device and (2) may be used by the exploit kit to select suitable exploit code for compromising the computing device. The computer-executable instructions may further cause the computing device to (1) monitor, in response to detecting the attempt to access the web page, behaviors of the client-side script, (2) detect, while monitoring the behaviors of the client-side script, an attempt by the client-side script to access an attribute of the computing device, (3) determine, based at least in part on detecting the attempt to access the attribute, that the web page is likely a landing page of the exploit kit, and (4) perform a security action in response to determining that the web page is likely a landing page of the exploit kit.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
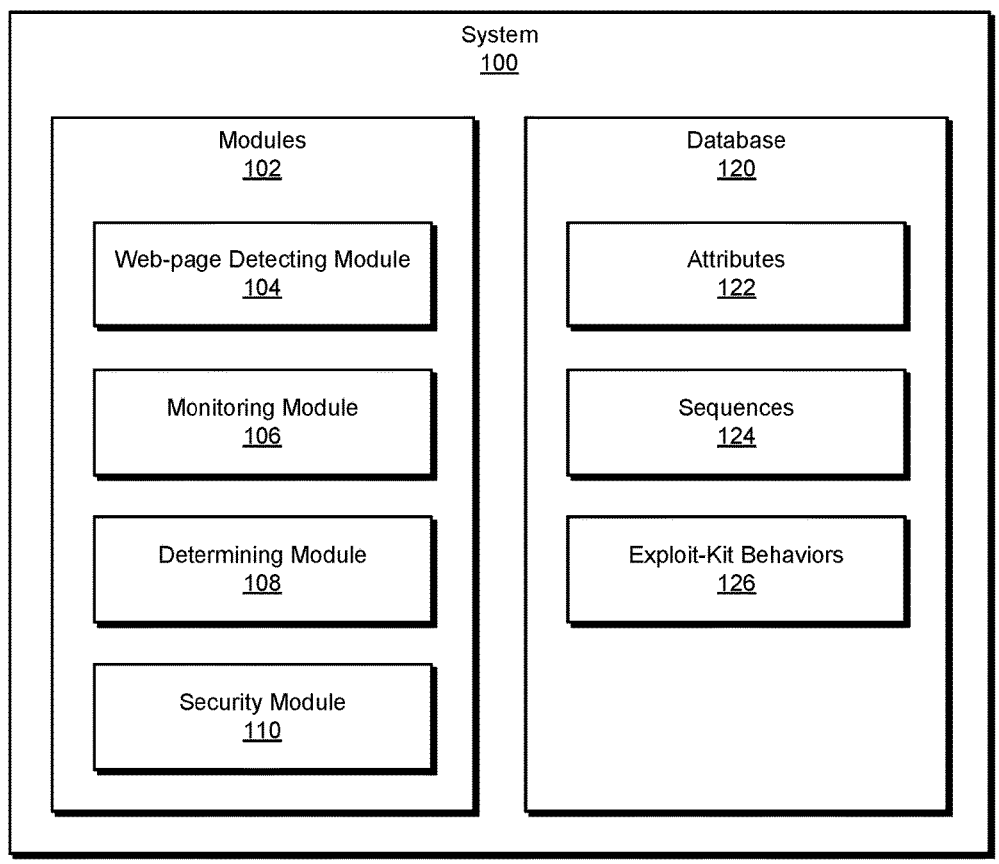
FIG. 1 is a block diagram of an exemplary system for detecting exploit-kit landing pages.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting exploit-kit landing pages. As will be explained in greater detail below, by monitoring certain web-browser variables and protocols access by a client-side script of a particular web page, the systems and methods described herein may determine whether the web page is or is likely a landing page of an exploit kit. Furthermore, in some examples, by determining when a web page is or is likely a landing page of an exploit kit, these systems and methods may redirect a user that attempts to access a landing page of an exploit kit to a safe web page and/or may otherwise prevent the exploit kit from compromising and exploiting the user's computing device. Moreover, by determining that a web page is or is likely a landing page of an exploit kit based on whether the landing page's client-side scripts access certain web-browser variables and protocols, the systems and methods described herein may protect computing devices from zero-day exploits. Embodiments of the instant disclosure may also provide various other advantages and features, as discussed in greater detail below.

Figure 2:
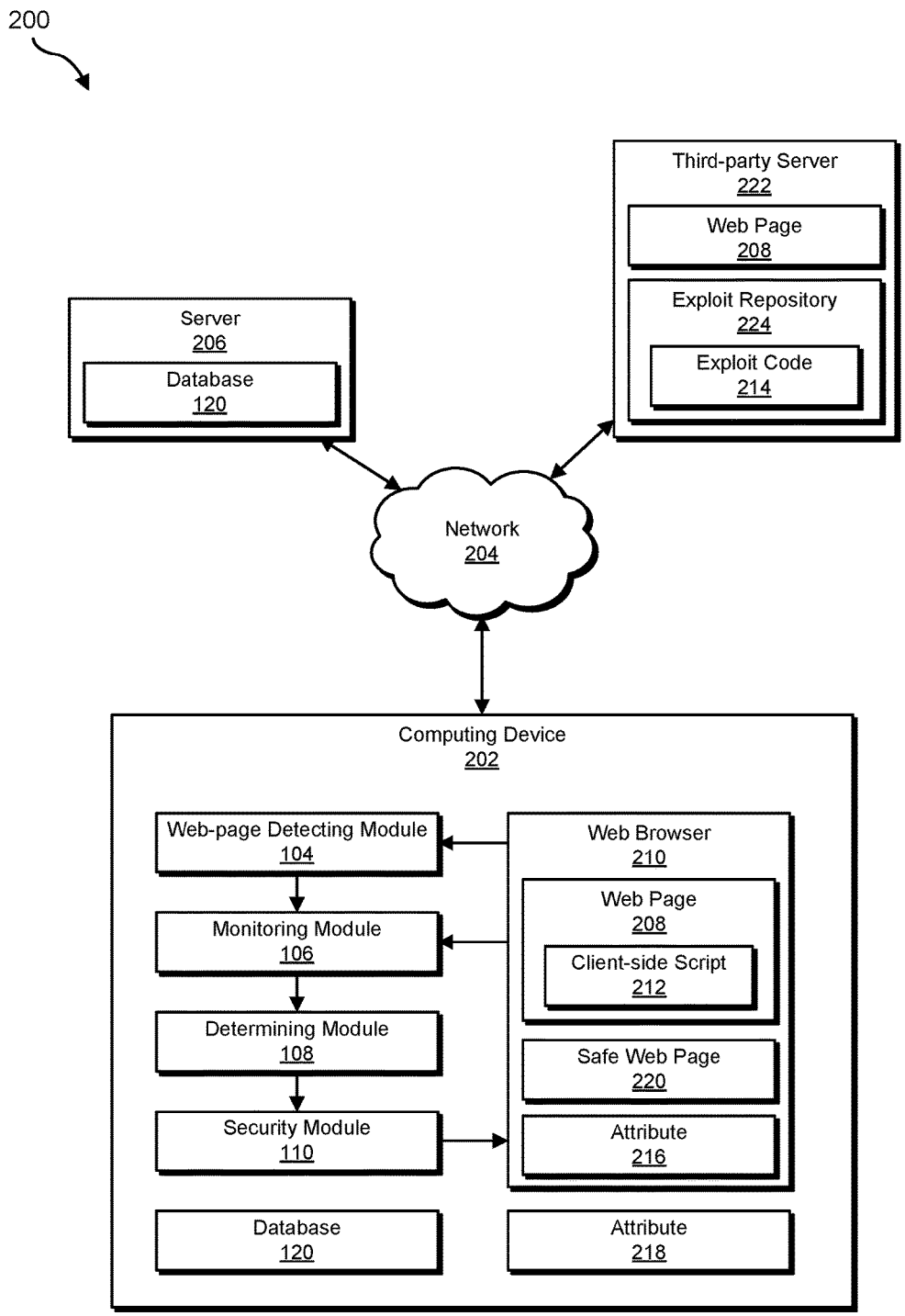
FIG. 2 is a block diagram of an additional exemplary system for detecting exploit-kit landing pages.

The following will provide, with reference to FIGS. 1-2, detailed descriptions of exemplary systems for detecting exploit-kit landing pages. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for detecting exploit-kit landing pages. As illustrated in this figure, exemplary system 100 may include one or more modules 102 for performing one or more tasks. For example, and as will be explained in greater detail below, exemplary system 100 may include a web-page detecting module 104, a monitoring module 106, a determining module 108, and a security module 110. In some examples, web-page detecting module 104 may detect an attempt to access a web page via a computing device. In such examples, the web page may be an unknown landing page of an exploit kit that includes a client-side script that is used by the exploit kit to access, at the computing device, attributes of the computing device that (1) may indicate a vulnerability of the computing device and (2) may be used by the exploit kit to select suitable exploit code for compromising the computing device.

In some examples, monitoring module 106 may (1) monitor, in response to the attempt to access the web page, behaviors of the client-side script and (2) detect, while monitoring the behaviors of the client-side script, an attempt by the client-side script to access an attribute of the computing device. In certain examples, determining module 108 may determine, in response to the attempt to access the attribute, that the web page is likely a landing page of the exploit kit. In at least one example, security module 110 may perform a security action in response to a determination that the web page is likely a landing page of the exploit kit. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 410 in FIG. 4, and/or portions of exemplary network architecture 500 in FIG. 5. In an additional example, modules 102 may represent all or a portion of a plugin of a web browser 210 executing on computing device 202. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include attributes 122 for storing information about one or more attributes that may be used by exploit kits to determine vulnerabilities of computing devices, sequences 124 for storing information about one or more sequences in which exploit kits access attributes of computing devices, and exploit-kit behaviors 126 for storing information about one or more behaviors that indicate that exploit kits are attempting to access attributes of computing devices.

Database 120 may represent portions of a single database or computing device or a plurality of databases or computing devices. For example, database 120 may represent a portion of server 206 in FIG. 2, computing system 410 in FIG. 4, and/or portions of exemplary network architecture 500 in FIG. 5. Alternatively, database 120 in FIG. 1 may represent one or more physically separate devices capable of being accessed by a computing device, such as server 206 in FIG. 2, computing system 410 in FIG. 4, and/or portions of exemplary network architecture 500 in FIG. 5.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202, a server 206, and a third-party server 222 that are capable of communicating via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to detect exploit-kit landing pages. For example, and as will be described in greater detail below, one or more of modules 102 may cause computing device 202 and/or server 206 to detect an attempt to access web page 208 via web browser 210. In this example, web page 208 may be an unknown landing page of an exploit kit that includes a client-side script 212 that is used by the exploit kit to access, at computing device 202, attributes of computing device 202 that (1) may indicate a vulnerability of computing device 202 and (2) may be used by the exploit kit to select suitable exploit code 214 for compromising computing device 202. After an attempt to access web page 208 is detected, one or more of modules 102 may further cause computing device 202 and/or server 206 to (1) monitor behaviors of client-side script 212, (2) detect, while monitoring the behaviors of client-side script 212, an attempt by client-side script 212 to access attribute 216 and/or attribute 218 of computing device 202, (3) determine, in response to detecting the attempt to access attribute 216 and/or attribute 218, that web page 208 is likely a landing page of the exploit kit, and (4) perform a security action in response to the determination that web page 208 is likely a landing page of the exploit kit (e.g., by redirecting web browser 210 to safe web page 220).

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 410 in FIG. 4, or any other suitable computing device. As shown, computing device 202 may include web browser 210. Web browser 210 may represent any application that may be used to access and view web pages hosted by a web server via the Internet. Examples of web browser 210 include, without limitation, INTERNET EXPLORER, GOOGLE CHROME, FIREFOX, SAFARI, ANDROID BROWSER, and/or AMAZON SILK. In some instances, web browser 210 may utilize a web-browser plugin (JAVA, PDF, FLASH, and/or SILVERLIGHT plugins) to render all or a portion of a web page.

Server 206 generally represents any type or form of computing device that is capable of reading computer-executable instructions. Examples of server 206 include, without limitation, application servers and database servers configured to provide various database services and/or run certain software applications.

Third-party server 222 generally represents any type or form of computing device that is capable of serving web pages, such as a web server. In some examples, third-party server 222 may represent a computing device of a malicious individual or organization that is using third-party server 222 to host an exploit kit, the exploit kit's landing pages (e.g., web page 208), and the exploit kit's exploit repository 224. In other examples, third-party server 222 may represent a computing device of an individual or organization that is using third-party server 222 to host a once benign web page (e.g., web page 208) that has been compromised and that is now acting as a landing page of an exploit kit.

Web page 208 may represent any document or resource that may be viewed using a web browser. In some examples, web page 208 may represent a text file, accessible via third-party server 222, that is formatted using a markup language (e.g., HyperText Markup Language (HTML) or Extensible Hypertext Markup Language (XHTML)), and may include, without limitation, text, images, client-side scripts (e.g., scripts written using JavaScript or Jscript), controls (e.g., ActiveX controls), files and/or hypertext links. In some examples, web page 208 may represent an unknown landing page of an exploit kit.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 500 in FIG. 5, or the like. Network 204 may facilitate communication or data transfer using wireless or wired connections. In one embodiment, network 204 may facilitate communication between computing device 202, server 206, and/or third-party server 222.

Figure 3:
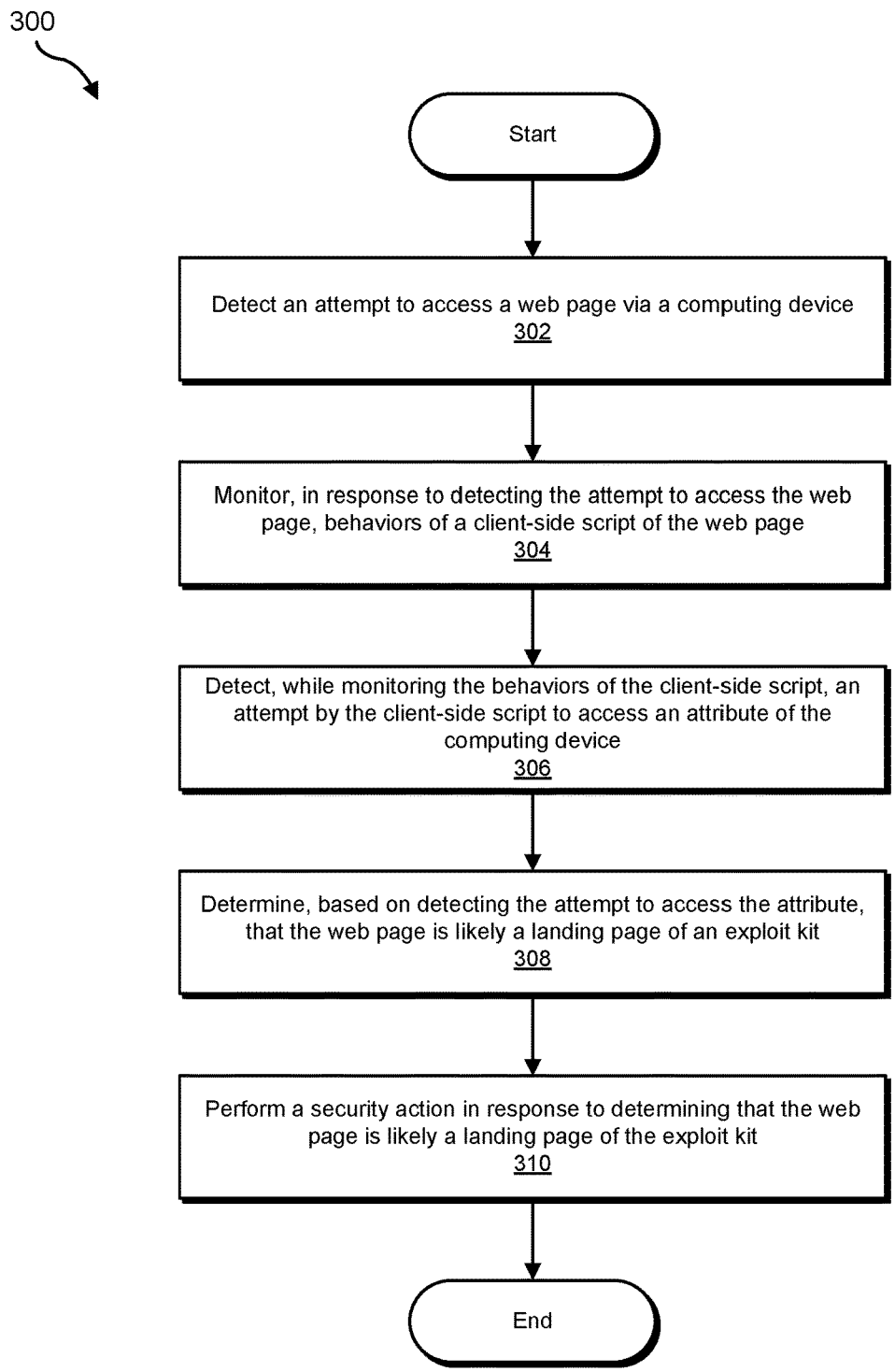
FIG. 3 is a flow diagram of an exemplary method for detecting exploit-kit landing pages.

FIG. 3 is a flow diagram of an exemplary computer-implemented method 300 for detecting exploit-kit landing pages. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 410 in FIG. 4, and/or portions of exemplary network architecture 500 in FIG. 5.

As illustrated in FIG. 3, at step 302 one or more of the systems described herein may detect an attempt to access a web page via a computing device. For example, web-page detecting module 104 may, as part of computing device 202 in FIG. 2, detect an attempt to access web page 208 via computing device 202.

Some web pages that are encountered by users may be landing pages of exploit kits. As used herein, the term "exploit kit" may refer to a software toolkit that may be used to automate, via a web server, the exploitation of client-side vulnerabilities for the purpose of delivering malicious payloads. Some exploit kits may be capable of exploiting many client-side vulnerabilities. In general, an exploit kit may include one or more landing pages and a backend exploit engine for selecting suitable exploit code that may compromise a particular computing device by exploiting its vulnerabilities.

An exploit kit's landing page may be used to identify a client-side vulnerability of a particular computing device. In general, an exploit kit's landing page may include a client-side script that fingerprints or profiles a computing device by gathering detailed information about the computing device. The term "client-side script," as used herein, may refer to scripts, such as a JAVASCRIPT script, designed to provide extensions to and/or control web browsers. Examples of information that may be gathered by a client-side script of an exploit kit and used by the exploit kit to identify a client-side vulnerability of a computing device may include, without limitation, web-browser names, web-browser types, web-browser versions, plugin names (e.g., names of JAVA, PDF, FLASH, and/or SILVERLIGHT plugins), plugin versions, operating-system names, operating-system versions, and/or information about installed software.

In some examples, an exploit kit's client-side JAVASCRIPT code may fingerprint a web browser or an operating system by accessing properties of various JAVASCRIPT and/or Document Object Model (DOM) objects. For example, an exploit kit's client-side JAVASCRIPT code may identify (1) the name and/or version of a web browser by accessing a Navigator Object's userAgent, appName, and/or appCodeName properties, (2) the names and/or versions of the web browser's plugins by accessing the Navigator Object's plugins property, and/or (3) the name and/or version of an operating system by accessing the Navigator Object's appVersion or platform properties. In some examples, an exploit kit's client-side JAVASCRIPT code may use the res:// protocol to enumerate specific software installed on a computing device. For example, an exploit kit's client-side JAVASCRIPT may use the res:// protocol to check for the presence of antivirus products, virtual environments, and/or analysis tools.

Once an exploit kit's client-side script fingerprints a computing device, the exploit kit's backend exploit engine may use the information gathered during the fingerprinting process to select and then push suitable exploit code onto the computing device, which targets specific vulnerabilities (e.g., a vulnerability of an identified version of a web browser and/or plugin). Typically after successfully exploiting a vulnerability, such exploit code may download and execute a malicious payload on the compromised computing device.

The systems described herein may detect attempts to access exploit-kit landing pages in any suitable manner. In some examples, web-page detecting module 104 may detect attempts to access, via a web browser, an exploit kit's landing page as part of a plugin (e.g., an extension or add-on) of the web browser. Additionally or alternatively, web-page detecting module 104 may detect attempts to access, via a web browser, an exploit kit's landing page as part of the web browser itself. As part of a web browser or a web-browser plugin, web-page detecting module 104 may detect when the web browser is directed to an exploit kit's landing page.

The systems described herein may detect attempts to access exploit-kit landing pages in a variety of contexts. For example, web-page detecting module 104 may operate as part of an end user's computing device and may identify attempts by the end user to access an exploit kit's landing page. In other examples, web-page detecting module 104 may operate as part of a security system that accesses web pages for the purpose of determining whether the web pages are or have become exploit-kit landing pages and may identify attempts by the security system to access an exploit kit's landing page. For example, web-page detecting module 104 may operate as part of a security system that monitors web pages of legitimate websites for the purpose of determining whether the web pages are or have become exploit-kit landing pages and may identify attempts by the security system to access the monitored web pages.

At step 304, one or more of the systems described herein may monitor, in response to the attempt to access the web page detected at step 302, behaviors of a client-side script of the web page. For example, monitoring module 106 may, as part of computing device 202 in FIG. 2, monitor behaviors of client-side script 212 of web page 208.

The systems described herein may monitor behaviors of client-side scripts in any suitable manner. In general, monitoring module 106 may monitor any behavior of a client-side script that may indicate that the client-side script is a client-side script of an exploit kit that is fingerprinting or profiling a computing device for the purpose of identifying vulnerabilities of the computing device. In some examples, monitoring module 106 may monitor a client-side script's attempts to access or use certain web-browser variables and protocols that may be used by a client-side script of an exploit kit to fingerprint a computing device for the purpose of identifying vulnerabilities of the computing device. For example, monitoring module 106 may monitor a client-side script's requests to access a Navigator Object's properties. Additionally or alternatively, monitoring module 106 may monitor a client-side script's use of the res:// protocol.

In some examples, monitoring module 106 may use Application Programming Interface (API) hooks to monitor behaviors of a client-side script. For example, monitoring module 106 may insert a hook within an API of a web browser for each function of the API that returns an attribute of a computing device that is commonly used by an exploit kit to fingerprint the computing device for the purpose of identifying vulnerabilities of the computing device. For example, monitoring module 106 may insert a hook within a web browser's API for any function of the API that returns one of the above mentioned attributes of a Navigator Object. Additionally or alternatively, monitoring module 106 may insert a hook within an API for each function of the API that is used to access a protocol that is commonly used by an exploit kit to fingerprint a computing device for the purpose of identifying vulnerabilities of the computing device. For example, monitoring module 106 may insert a hook within an API for each function of the API that is used to access the res:// protocol.

At step 306, one or more of the systems described herein may detect, while monitoring the behaviors of the client-side script, an attempt by the client-side script to access an attribute of the computing device. For example, monitoring module 106 may, as part of computing device 202 in FIG. 2, detect, while monitoring behaviors of client-side script 212, an attempt by client-side script 212 to access attribute 216 of web browser 210.

The systems described herein may perform step 306 in any suitable manner. In general, monitoring module 106 may detect that a client-side script is attempting to access an attribute of a computing device by detecting any behavior of the client-side script that indicates that the client-side script is attempting to access the attribute. For example, monitoring module 106 may detect that a client-side script is attempting to access the name and/or version of a web browser by detecting that the client-side script has attempted to access a Navigator Object's userAgent, appName, and/or appCodeName properties. Similarly, monitoring module 106 may detect that a client-side script is attempting to access the name and/or version of a web browser's plugins by detecting that the client-side script has attempted to access a Navigator Object's plugins property. Likewise, monitoring module 106 may detect that a client-side script is attempting to access the name and/or version of an operating system by detecting that the client-side script has attempted to access a Navigator Object's appVersion or platform properties. In some examples, monitoring module 106 may detect that a client-side script is attempting to enumerate specific software installed on a computing device by detecting that the client-side script has attempted to use the res:// protocol.

At step 308, one or more of the systems described herein may determine, based on detecting the attempt to access the attribute, that the web page is likely a landing page of an exploit kit. For example, determining module 108 may, as part of computing device 202 in FIG. 2, determine, based on detecting an attempt by client-side script 212 to access attribute 216, that web page 208 is likely a landing page of an exploit kit.

The systems described herein may perform step 308 in any suitable manner. In some examples, determining module 108 may determine that a web page is or is likely a landing page of an exploit kit if a client-side script of the web page attempts to access any attribute of a computing device that may be used to identify vulnerabilities of the computing device and/or if the client-side script exhibits any behaviors that indicate that the client-side script has attempted to access such attributes of the computing device. Additionally or alternatively, determining module 108 may determine that a web page is or is likely a landing page of an exploit kit only if a client-side script of the web page attempts to access more than a predetermined number of attributes of a computing device that may be used to identify vulnerabilities of the computing device and/or only if the client-side script exhibits more than a predetermined number of behaviors that indicate that the client-side script has attempted to access such attributes of the computing device.

In some examples, determining module 108 may determine that a web page is or is likely a landing page of an exploit kit if the sequence in which a client-side script of the web page attempts to access attributes of a computing device matches a sequence known to be used by known exploit-kit scripts to access attributes of computing devices. Likewise, determining module 108 may determine that a web page is a landing page of an exploit kit if the sequence in which a client-side script of the web page performs behaviors that indicate that the client-side script has attempted to access attributes of a computing device matches a sequence of behaviors known to be exhibited by exploit-kit scripts. In some examples, determining module 108 may determine that a web page of a legitimate website has become a landing page of an exploit kit by determining that the sequence in which client-side scripts of the web page attempt to access attributes of a computing device does not match a previously recorded sequence of attempts of client-side scripts of the web page.

At step 310, one or more of the systems described herein may perform a security action in response to determining that the web page is likely a landing page of the exploit kit. For example, security module 110 may, as part of computing device 202 in FIG. 2, perform a security action in response to determining that web page 208 is likely a landing page of an exploit kit.

The systems described herein may perform step 310 in any suitable manner. For example in the context of an end user attempting to access a web page that is or is likely a landing page of an exploit kit, security module 110 may perform a security action by halting execution of client-side scripts of the landing page, warning the end user that the web page that the end-user is attempting to access is or is likely a landing page of an exploit kit, and/or redirecting the end user to a safe web page. Additionally or alternatively, security module 110 may perform a security action in response to determining that a web page is or is likely a landing page of an exploit kit by collecting information about the attempt to access the landing page (e.g., the sequence of web pages accessed before the landing page) and/or by collecting information about the behaviors of the landing page's client-side scripts (e.g., a sequence of behaviors). In some examples, security module 110 may upload such information to a backend server and/or may distribute such information to other computing devices for the purpose of detecting similar exploit-kit landing pages.

In the context of a security system that monitors web pages of legitimate websites, security module 110 may, in response to determining that a web page of a legitimate website is or is likely a landing page of an exploit kit, notify an owner or administrator of the legitimate website of the web page having become an exploit-kit landing page. Upon completion of step 310, exemplary method 300 in FIG. 3 may terminate.

As explained above, by monitoring certain web-browser variables and protocols access by a client-side script of a particular web page, the systems and methods described herein may determine whether the web page is or is likely a landing page of an exploit kit. Furthermore, in some examples, by determining when a web page is or is likely a landing page of an exploit kit, these systems and methods may redirect a user that attempts to access a landing page of an exploit kit to a safe web page and/or may otherwise prevent the exploit kit from compromising and exploiting the user's computing device. Moreover, by determining that a web page is or is likely a landing page of an exploit kit based on whether the landing page's client-side scripts access certain web-browser variables and protocols, the systems and methods described herein may protect computing devices from zero-day exploits.

For example in one scenario, a user may be redirected to a landing page of an exploit kit while surfing the web, and a client-side JAVASCRIPT script of the landing page may attempt to determine correct exploit code to be delivered to the user by checking the user's environment for a web-browser type and/or version, an operating-system type and/or version, installed plugins (e.g., PDF, JAVA, FLASH, and/or SILVERLIGHT plugins), antivirus products, a virtual environment, and/or analysis tools. In such a scenario, the systems and methods disclosed herein may, as part of a web-browser plugin, monitor the client-side JAVASCRIPT script's requests to check any of the above environment variables. If the client-side JAVASCRIPT script requests to check one or any combination of the above mentioned environment variables, the systems and methods disclosed herein may (1) stop execution of all JAVASCRIPT scripts on the landing page to prevent exploit code from being downloaded, (2) warn the user, and/or (3) redirect the user to a safe web page.

Figure 4:
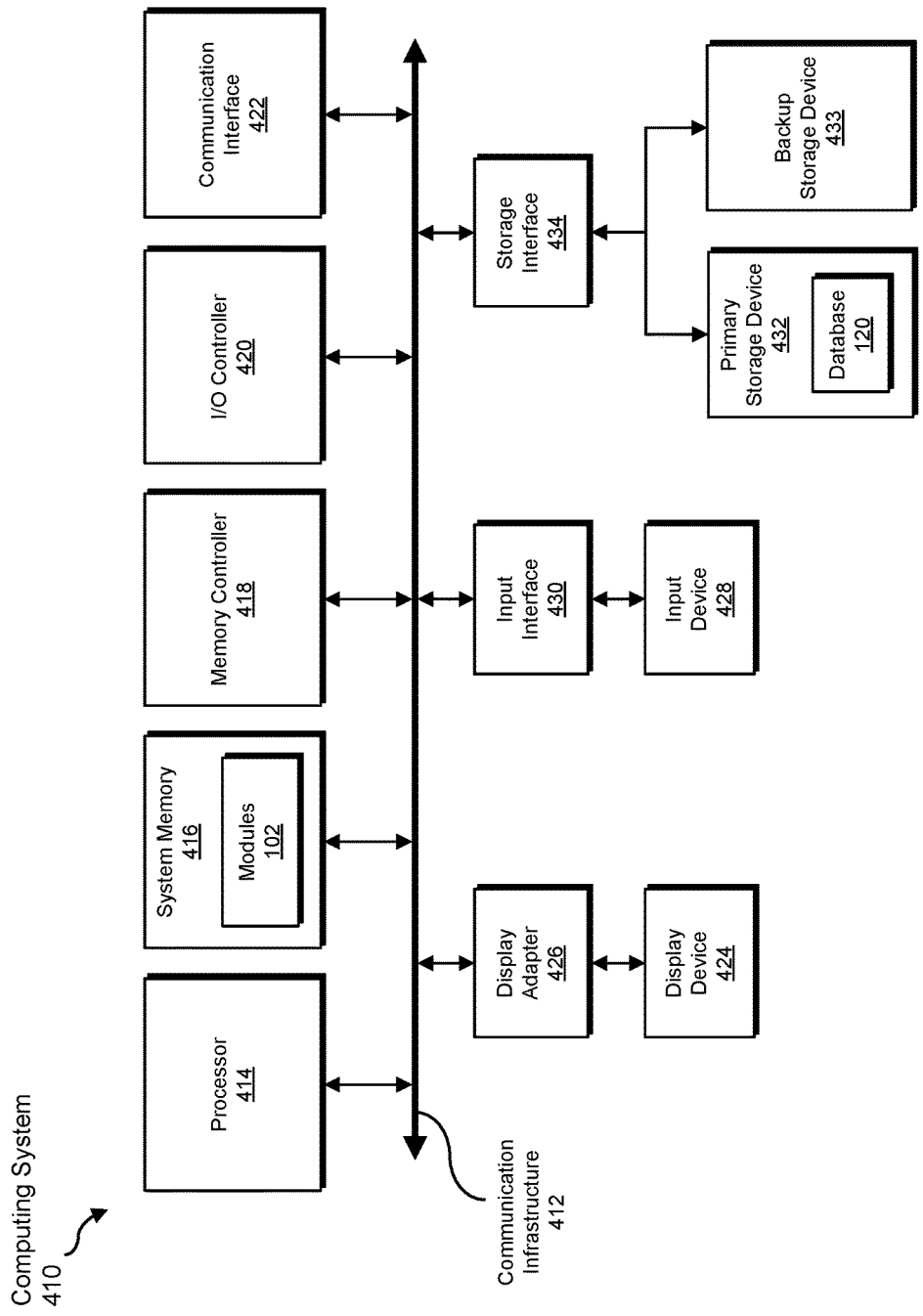
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. For example, all or a portion of computing system 410 may perform and/or be a means for performing, either alone or in combination with other elements, one or more of the steps described herein (such as one or more of the steps illustrated in FIG. 3). All or a portion of computing system 410 may also perform and/or be a means for performing any other steps, methods, or processes described and/or illustrated herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of physical processing unit (e.g., a hardware-implemented central processing unit) capable of processing data or interpreting and executing instructions. In certain embodiments, processor 414 may receive instructions from a software application or module. These instructions may cause processor 414 to perform the functions of one or more of the exemplary embodiments described and/or illustrated herein.

System memory 416 generally represents any type or form of volatile or non-volatile storage device or medium capable of storing data and/or other computer-readable instructions. Examples of system memory 416 include, without limitation, Random Access Memory (RAM), Read Only Memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI Express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a solid state drive, a floppy disk drive, a magnetic tape drive, an optical disk drive, a flash drive, or the like. Storage interface 434 generally represents any type or form of interface or device for transferring data between storage devices 432 and 433 and other components of computing system 410. In one example, database 120 from FIG. 1 may be stored in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an Application Specific Integrated Circuit (ASIC) adapted to implement one or more of the exemplary embodiments disclosed herein.

Figure 5:
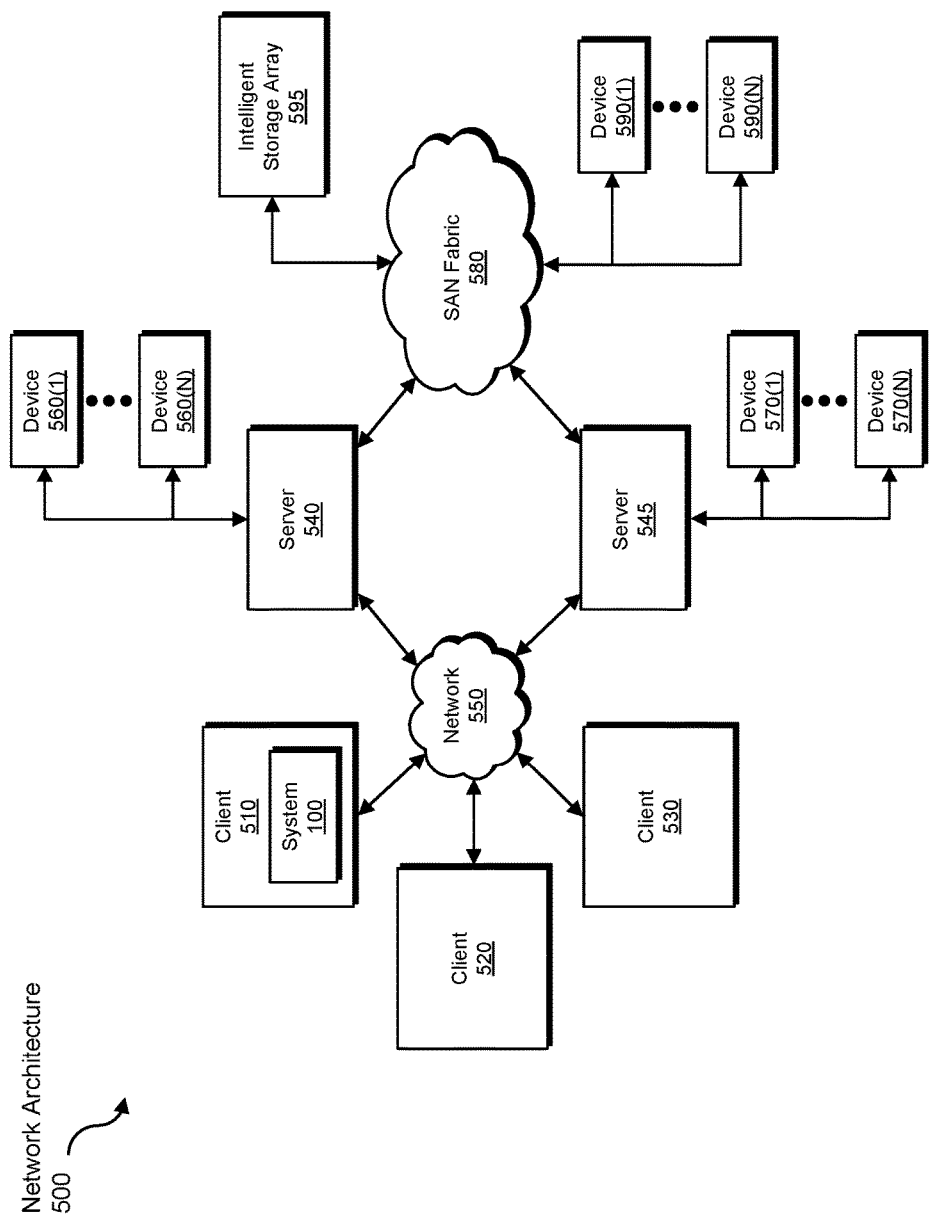
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. As detailed above, all or a portion of network architecture 500 may perform and/or be a means for performing, either alone or in combination with other elements, one or more of the steps disclosed herein (such as one or more of the steps illustrated in FIG. 3). All or a portion of network architecture 500 may also be used to perform and/or be a means for performing other steps and features set forth in the instant disclosure.

Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a WAN, a LAN, a PAN, or the Internet. In one example, client systems 510, 520, and/or 530 and/or servers 540 and/or 545 may include all or a portion of system 100 from FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent Network-Attached Storage (NAS) devices configured to communicate with servers 540 and 545 using various protocols, such as Network File System (NFS), Server Message Block (SMB), or Common Internet File System (CIFS).

Servers 540 and 545 may also be connected to a Storage Area Network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550.

As detailed above, computing system 410 and/or one or more components of network architecture 500 may perform and/or be a means for performing, either alone or in combination with other elements, one or more steps of an exemplary method for detecting exploit-kit landing pages.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive information about a client-side script's behavior, transform the information into a determination that the client-side script is or is likely that of an exploit kit, output a result of the transformation to a security system that prevents the exploit kit from compromising computing devices, use the result of the transformation to prevent the exploit kit from compromising a computing device, and store the result of the transformation to a repository of exploit-kit information. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting exploit-kit landing pages, at least a portion of the method being performed by a computing device comprising at least one processor, the method comprising:
    detecting an attempt to access a web page via the computing device, wherein the web page comprises a client-side script;
    monitoring, in response to detecting the attempt to access the web page, attempts to call a plurality of functions of an Application Programming Interface (API) of the computing device, wherein each of the plurality of functions of the API returns an attribute of the computing device known to be used by exploit kits to fingerprint computing devices and identify vulnerabilities of the computing devices;
    detecting, before the client-side script downloads exploit code for compromising the computing device and while monitoring attempts to call the plurality of functions of the API, an attempt by the client-side script to call one of the plurality of functions of the API and access an attribute of the computing device that indicates a vulnerability of the computing device and enables an exploit kit to select suitable exploit code for compromising the computing device;
    determining, based at least in part on detecting the attempt to call the one of the plurality of functions of the API and access the attribute, that the web page is likely an unknown landing page of an exploit kit; and
    performing a security action in response to determining that the web page is likely an unknown landing page of an exploit kit.

2. The computer-implemented method of claim 1, wherein:
    detecting the attempt to access the web page via the computing device comprises detecting an attempt by a user of the computing device to access the web page;
    performing the security action comprises preventing exploit code from compromising the computing device.

3. The computer-implemented method of claim 1, wherein:
    monitoring attempts to call the plurality of functions of the API of the computing device comprises inserting, for each of the plurality of functions, an event hook within the API; and
    the attempt by the client-side script to call the one of the plurality of functions of the API and access the attribute of the computing device is detected via the event hook of the one of the plurality of functions.

4. The computer-implemented method of claim 1, wherein:
    detecting the attempt by the client-side script to call the one of the plurality of functions and access the attribute of the computing device comprises:
        detecting attempts by the client-side script to call two or more of the plurality of functions and access each of one or more attributes of the computing device that are known to indicate a vulnerability of the computing device and enable an exploit kit to select suitable exploit code for compromising the computing device;
        recording a sequence in which the client-side script attempts to call the two or more of the plurality of functions and access each of the one or more attributes;
    performing the security action comprises using the sequence to detect an additional unknown landing page of an exploit kit.

5. The computer-implemented method of claim 1, further comprising recording, prior to the web page becoming a likely landing page of an exploit kit, one or more attempts, by an additional client-side script of the web page, to call the plurality of functions and access attributes of the computing device, wherein determining that the web page is likely an unknown landing page of an exploit kit comprises determining that the client-side script and the additional client-side script attempted to call different functions and access different attributes of the computing device.

6. The computer-implemented method of claim 1, wherein determining that the web page is likely an unknown landing page of an exploit kit comprises determining that the client-side script accessed more than a threshold number of attributes of the computing device that are known to indicate a vulnerability of the computing device and enable an exploit kit to select suitable exploit code for compromising the computing device.

7. The computer-implemented method of claim 1, wherein:
the API of the computing device is an API of a web browser used to access the web page; and
the attribute comprises an attribute of the web browser.

8. The computer-implemented method of claim 1, wherein:
the API of the computing device is an API of a web browser used to access the web page; and
the attribute comprises an attribute of an operating system of the computing device.

9. The computer-implemented method of claim 1, wherein:
the API of the computing device is an API of a web browser used to access the web page; and
the attribute comprises an attribute of a plugin of the web browser.

10. The computer-implemented method of claim 1, wherein:
the API of the computing device is an API of a web browser used to access the web page; and
the attribute comprises an attribute of an application installed on the computing device.

11. The computer-implemented method of claim 1, wherein:
detecting the attempt by the client-side script to call the one of the plurality of functions and access the attribute of the computing device comprises:
detecting attempts by the client-side script to call each of the plurality of functions and access each of a plurality of attributes of the computing device that are known to indicate a vulnerability of the computing device and enable an exploit kit to select suitable exploit code for compromising the computing device; and
recording a sequence in which the client-side script attempts to call each of the plurality of functions and access each of the plurality of attributes;
determining that the web page is likely an unknown landing page of an exploit kit comprises determining that the sequence in which the client-side script attempts to call each of the plurality of functions and access each of the plurality of attributes matches a known sequence by which exploit kits are known to attempt to access each of the plurality of attributes.

12. A system for detecting exploit-kit landing pages, the system comprising:
a web-page detecting module, stored in memory, that detects an attempt to access a web page via a computing device, wherein
the web page comprises a client-side script;
a monitoring module, stored in memory, that:
monitors, in response to the attempt to access the web page, attempts to call a plurality of functions of an Application Programming Interface (API) of the computing device, wherein each of the plurality of functions of the API returns an attribute of the computing device known to be used by exploit kits to fingerprint computing devices and identify vulnerabilities of the computing devices;
detects, before the client-side script downloads exploit code for compromising the computing device and while monitoring attempts to call the plurality of functions of the API, an attempt by the client-side script to call one of the plurality of functions of the API and access an attribute of the computing device that indicates a vulnerability of the computing device and enables an exploit kit to select suitable exploit code for compromising the computing device;
a determining module, stored in memory, that determines, based at least in part on the attempt to call the one of the plurality of functions of the API and access the attribute, that the web page is likely an unknown landing page of an exploit kit;
a security module, stored in memory, that performs a security action in response to a determination that the web page is likely an unknown landing page of an exploit kit; and
at least one processor that executes the web-page detecting module, the monitoring module, the determining module, and the security module.

13. The system of claim 12, wherein:
the web-page detecting module detects the attempt to access the web page via the computing device by detecting an attempt by a user of the computing device to access the web page;
the security module performs the security action by preventing exploit code from compromising the computing device.

14. The system of claim 13, wherein:
the monitoring module monitors attempts to call the plurality of functions of the API of the computing device by inserting, for each of the plurality of functions, an event hook within the API; and
the monitoring module detects the attempt by the client-side script to call the one of the plurality of functions of the API and access the attribute of the computing device via the event hook of the one of the plurality of functions.

15. The system of claim 12, wherein:
the monitoring module detects the attempt by the client-side script to call the one of the plurality of functions and access the attribute of the computing device by:
detecting attempts by the client-side script to call two or more of the plurality of functions and access each of one or more attributes of the computing device that are known to indicate a vulnerability of the computing device and enable an exploit kit to select suitable exploit code for compromising the computing device;
recording a sequence in which the client-side script attempts to call the two or more of the plurality of functions and access each of the one or more attributes;
the security module performs the security action by using the sequence to detect an additional unknown landing page of an exploit kit.

16. The system of claim 12, wherein:
the monitoring module further records, prior to the web page becoming a likely landing page of an exploit kit, one or more attempts, by an additional client-side script of the web page, to call the plurality of functions and access attributes of the computing device;
the determining module determines that the web page is likely an unknown landing page of an exploit kit by determining that the client-side script and the additional client-side script attempted to call different functions and access different attributes of the computing device.

17. The system of claim 12, wherein the determining module determines that the web page is likely an unknown landing page of an exploit kit by determining that the client-side script accessed more than a threshold number of attributes of the computing device that are known to indicate a vulnerability of the computing device and enable an exploit kit to select suitable exploit code for compromising the computing device.

18. The system of claim 12, wherein the attribute comprises one or more of:
- an attribute of a web browser used to access the web page;
- an attribute of an operating system of the computing device;
- an attribute of a web-browser plugin;
- an attribute of an application installed on the computing device.

19. The system of claim 12, wherein:
- the monitoring module detects the attempt by the client-side script to call the one of the plurality of functions and access the attribute of the computing device by:
  - detecting attempts by the client-side script to call each of the plurality of functions and access each of a plurality of attributes of the computing device that are known to indicate a vulnerability of the computing device and enable an exploit kit to select suitable exploit code for compromising the computing device; and
  - recording a sequence in which the client-side script attempts to call each of the plurality of functions and access each of the plurality of attributes;
- the determining module determines that the web page is likely an unknown landing page of an exploit kit by determining that the sequence in which the client-side script attempts to call each of the plurality of functions and access each of the plurality of attributes matches a known sequence by which exploit kits are known to attempt to access each of the plurality of attributes.

20. A non-transitory computer-readable medium comprising one or more computer-executable instructions that, when executed by at least one processor of a computing device, cause the computing device to:
- detect an attempt to access a web page via the computing device, wherein the web page comprises a client-side script;
- monitor, in response to detecting the attempt to access the web page, attempts to call a plurality of functions of an Application Programming Interface (API) of the computing device, wherein each of the plurality of functions of the API returns an attribute of the computing device known to be used by exploit kits to fingerprint computing devices and identify vulnerabilities of the computing devices;
- detect, before the client-side script downloads exploit code for compromising the computing device and while monitoring attempts to call the plurality of functions of the API, an attempt by the client-side script to call one of the plurality of functions of the API and access an attribute of the computing device that indicates a vulnerability of the computing device and enables an exploit kit to select suitable exploit code for compromising the computing device;
- determine, based at least in part on detecting the attempt to call the one of the plurality of functions of the API and access the attribute, that the web page is likely an unknown landing page of an exploit kit; and
- perform a security action in response to determining that the web page is likely an unknown landing page of an exploit kit.

* * * * *